US007702645B2

(12) United States Patent
Khushraj et al.

(10) Patent No.: US 7,702,645 B2
(45) Date of Patent: Apr. 20, 2010

(54) METHOD, APPARATUS AND COMPUTER PROGRAM PRODUCT FOR MAKING SEMANTIC ANNOTATIONS FOR EASY FILE ORGANIZATION AND SEARCH

(75) Inventors: Deepali Khushraj, Waltham, MA (US); Ora Lassila, Hollis, NH (US)

(73) Assignee: Nokia Corporation, Espoo (FI)

( * ) Notice: Subject to any disclaimer, the term of this patent is extended or adjusted under 35 U.S.C. 154(b) by 316 days.

(21) Appl. No.: 11/428,134

(22) Filed: Jun. 30, 2006

(65) Prior Publication Data
US 2008/0005147 A1 Jan. 3, 2008

(51) Int. Cl.
*G06F 17/30* (2006.01)
(52) U.S. Cl. ......................... 707/102; 707/10
(58) Field of Classification Search .................... 707/10, 707/100, 101, 102, 103 R, 103 Y, 103 X, 707/103 Z, 104.1; 379/185; 725/112
See application file for complete search history.

(56) References Cited
U.S. PATENT DOCUMENTS

| 7,099,885 | B2 * | 8/2006 | Hellman et al. | 707/103 R |
| 2003/0126136 | A1 * | 7/2003 | Omoigui | 707/10 |
| 2004/0107155 | A1 * | 6/2004 | Yanosy | 705/37 |
| 2004/0153451 | A1 * | 8/2004 | Phillips et al. | 707/8 |
| 2007/0124789 | A1 * | 5/2007 | Sachson et al. | 725/117 |

OTHER PUBLICATIONS

Utz Wesermann et al., "EMMOS: Tradable units of knowledge-enriched multimedia content", Aug. 2004, Research Studios Austria, Digital Memory Engineering, Wien, Austria, pp. 1-40 (http://www.cs.univie.ac.at/upload/publications/00000/manuscript.pdf).*
McGuinness, et al. "Owl Web Ontology Language Overview," *W3C Recommendation*, Feb. 10, 2004, http://wvvw.w3.org/TR/2004/REC-owl-features-20040210/.
Manola, et al., "RDF Primer," *WC3 Recommendation*, Feb. 10, 2004, http://www.w3org/TR/2004/REC-rdf-primer-20040210/.
Berners-Lee, et al., "The Semantic Web," *Scientific America*, 284(5):34-43, May 17, 2001 See also http://www.sciam.com/article.cfm?id=the-semantic-web&print=true.
(Continued)

*Primary Examiner*—Diane Mizrahi
(74) *Attorney, Agent, or Firm*—Alston & Bird LLP

(57) ABSTRACT

A device for generating semantic folder annotations is provided. The device includes a semantic folder editor which enables a user to create attribute-value pairs corresponding to a semantic folder(s). The device is capable of downloading ontolog(ies) and associated data from an ontology server which may be utilized to determine relationships between the attribute-value pairs created by the user. The device includes an annotations generator which specifies the semantic folder descriptions of the semantic folders based on attribute-value relationships determined by the ontolog(ies). The device is capable of allowing a user to insert an object(s) into a semantic folder(s) and the annotations generator assigns all attribute-value pairs corresponding to the semantic folder to the object(s). The annotations assigned to object(s) may be stored in a semantic triple store. The device further includes a search engine which may be employed by a user to search semantic folders to locate an object(s).

31 Claims, 10 Drawing Sheets

OTHER PUBLICATIONS

Lassila, et al., Resource Description Framework (RDF) Model and Syntax Specification, *W3C*, Feb. 22, 1999, http://www.w3.org/TR/1999/REC-rdf-syntax-19990222.

Gruber, "A translation Approach to Portable Ontology Specifications," *Knowledge System Laboratoty*, pp. 1-25, 1992.

Gifford, et al., "Semantic File Systems," Proceedings of the Thirteenth ACM Symposium on Operating Systems Principles, pp. 16-25, Oct. 1991.

Soules, et al., "Toward Automatic Context-Based Attribute Assignment for Semantic File Systems," *Carnegie Mellon University Parallel Data Laboratory Technical Report*, CMU-PDL-04-105, Jun. 2004.

Khushraj, et al., "Ontological Approach to Generating Personalized User Interfaces for Web Services," *International Semantic Web Conference*, 2005, 916- 927.

"Wilbur Semantic Web Toolkit for CLOS," http://wilbur-rdf.sourceforge.net, Sep. 20, 2005.

"Jena," http://jena.sourceforge.net/index.html, Sep. 22, 2003.

"Redland RDF Application Framework," http://librdf.org/, 2000.

"BrownSauce," http://brownsauce.sourceforge.net/, Oct. 28, 2002.

\* cited by examiner

METHOD, APPARATUS AND COMPUTER PROGRAM PRODUCT FOR MAKING SEMANTIC ANNOTATIONS FOR EASY FILE ORGANIZATION AND SEARCH

FIELD OF THE INVENTION

The present invention relates generally to systems and methods of generating detailed annotations for resources and, more particularly, relates to systems and methods of organizing resources by using the detailed annotations so that organization of resources in folders is performed with ease and so that the time required in searching for resources on the system is reduced.

BACKGROUND OF THE INVENTION

The World Wide Web has developed primarily as medium of content for human consumption. Automating tasks on the Web (such as information retrieval, synthesis of information, etc.) is difficult because human interpretation is often required to make information content useful. Offering relief, a new architecture for the Web is emerging, known as the "Semantic Web." In broad terms, the Semantic Web encompasses efforts to create mechanisms that augment content with formal semantics, thereby producing content suitable for automated systems (e.g., intelligent software agents) to consume. The Semantic Web permits more automated functions on the Web (e.g., reasoning, information and service discovery, service composition, etc.), easing the workload of its users.

The Semantic Web will also pave the way for true "device independence" and customization of information content for individual users. Information on the Web can now exist in a "raw form" and any context-dependent presentation can be rendered on demand (more generally, the Semantic Web represents a departure from the current "rendering-oriented" Web). It is important to note that the Semantic Web is not a separate Web but an extension of the current one in which information, when given this well-defined meaning, better enables computers and people to work in tandem. The Semantic Web is an initiative aimed at making data on the World Wide Web (WWW) more machine processable so that applications can gain maximum benefit from this data.

In the Semantic Web, content and services can be described using representation languages such as RDF (Resource Description Framework) (See e.g., Frank Manola and Eric Miller, *RDF Primer*, W3C RECOMMENDATION (Feb. 10, 2004) the contents of which is hereby incorporated by reference in its entirety) and OWL (Ontology Web Language). (For more information on OWL, see Deborah L. McGuinness & Frank van Harmelen (eds.), *OWL Web Ontology Language Overview*, W3C RECOMMENDATION (Feb. 10, 2004) the contents of which is incorporated herein in its entirety) In this regard, representations often refer to ontologies or specifications of conceptualizations that, in turn, enable reasoning via the use of logic rules. More particularly, ontologies may define domains by specifying, for example, concepts (i.e., classes), relationships between concepts, properties of concepts (i.e., slots), restrictions on properties (i.e., facets), individuals (i.e., instances), or the like. Ontologies may include, for example, personal information management (PIM) ontologies, location ontologies, temporal ontologies, social network ontologies, composite capability/preference profiles (CC/PP) schema, Web service ontologies (e.g., OWL-S, Web Service Modeling Ontology—WSMO), policy ontologies, and the like. For more information on the Semantic Web, see Berners-Lee, Hendler, and Lassila, *The Semantic Web*, SCIENTIFIC AMERICAN, 284(5):3443, May 2001.

The application of Semantic Web technologies to Web services may be referred to as Semantic Web services whereby descriptions of service interfaces are associated with formal semantics, allowing software agents to describe their functionality, discover and "understand" other agents' functionality and invoke services provided by other agents. Furthermore, it may be possible to combine multiple services into new services. Work on Semantic Web services is at least partially driven by the possibility to automate things that formerly have required human involvement, consequently leading to improved interoperability.

As known to those skilled in the art, RDF and OWL are two key Semantic web standards. These standards make machine consumption easy by use of Uniform Resource Identifiers (URIs) to uniquely identify resources. Moreover, both of these standards provide a common data model and a machine processable language to exchange information. For instance, both OWL and RDF use the RDF data model and both use Extensible Markup Language (XML)-based syntax (RDF/XML) machine processable language to exchange information. Additionally, RDF and OWL maintain a common vocabulary with unambiguous formal semantics. To be precise, RDF may utilize RDF Schema (RDFS) as a language for describing vocabularies in RDF. Similarly, OWL which is also a vocabulary language extension of RDF and RDFS may utilize constructs defined by RDF and RDFS.

Data models that use RDF or OWL enable applications to integrate data created by heterogeneous sources and allows derivation of implicit relationships between resources (as referred to in the art as inferencing). (As referred to herein inferencing typically means the process of applying rules that describe what can be derived (for example, what types of relationships can be added to resources) and the conditions under which such derivations (additions) are undertaken. Both RDF and OWL have an associated set of rules that allow implicit relationships between resources to be derived. For example, a resource named "Felix" is of type "Cat", and "Cat" is a subclass of "Mammal." By virtue of RDF's standard inference rules the information that "Felix" is also of type "Mammal" can be derived.) As known to those skilled in the art, RDF is a language for representing information about resources in the WWW. It is particularly intended for representing metadata about Web resources, such as the title, author, and modification date of a Web page, as well as copyright and licensing information about a Web document, or the availability schedule for a shared resource. However, by generalizing the notion of a Web resource, RDF can additionally be used to represent information about things or objects that can be identified on the Web, even when the things or objects cannot be directly retrieved via the Web. Some examples include, but are not limited to, information concerning availability of items from on-line shopping store (e.g., information about specifications, prices, availability, etc.), or the description of a Web user's preferences regarding information that he/she may want delivered to them.

As known to those skilled in the art, RDF is premised on the notion of identifying things (i.e., objects) using Web identifiers such as URIs and describing resources in terms of simple properties and property values. The use of URIs enables RDF to represent simple statements, concerning resources, as a network (also known as a "graph") of nodes and arcs representing the resources, as well as their respective properties and values. For instance, consider FIG. 1 in which an RDF graph describing attributes of a person named Eric Miller is provided. More particularly, in FIG. 1 a group of statements, such as "there is a person identified by http://www.org/People/EM/contact#me 73, whose name is Eric Miller 75, whose e-mail address is em@w3.org 77 and whose title is Dr." is illustrated. As shown in FIG. 1, the RDF graph demonstrates that RDF may utilize URIs to identify an individual(s), for example, Eric Miller 75 identified by the URI http://www.w3.org/People/EM/contact#me 73. FIG. 1 also illustrates kinds of things such as for example, a person, which is identified by URI http://www.w3.org/2000/10/swap/pim/contact#Person 71. Similarly, FIG. 1 illustrates properties of those things, for example, a mailbox of that person identified by URI http://www.w3.org/2000/10/swap/pim/contact#mailbox and values of those properties.

As shown below in Table 1, RDF also provides XML-based syntax (RDF/XML) for recording and exchanging the graphs shown in FIG. 1. The example below in Table 1 also illustrates a portion of the RDF in RDF/XML corresponding to the graph in FIG. 1.

TABLE 1

Example: RDF/XML Describing Eric Miller

```
<?xml version="1.0"?>
<rdf:RDF xmlns:rdf="http://www.w3.org/1999/02/22-rdf-syntax-ns#"
     xmlns:contact="http://www.w3.org/2000/10/swap/pim/contact#">
  <contact:Person rdf:about="http://www.w3.org/People/EM/
  contact#me">
    <contact:fullName>Eric Miller</contact:fullName>
    <contact:mailbox rdf:resource="mailto:em@w3.org"/>
    <contact:personalTitle>Dr.</contact:personalTitle>
  </contact:Person>
</rdf:RDF>
```

It should be noted that unlike conventional hypertext, RDF URIs may refer to any identifiable thing or object, including things or objects not retrievable on the WWW (such as, for example, the person of Eric Miller). The result is that in addition to describing such things or objects as Web pages, RDF can also describe vehicles, organizations, businesses, people, news events, etc. In addition, RDF properties have URIs to precisely identify relationships that exist between the linked items. In this regard, resources such as, documents, e-mails, web pages, bookmarks, and the like, located on a desktop of a terminal (e.g., personal computer, laptop computer, mobile telephone, Personal Digital Assistant (PDA), etc.) of an end-user may be identified using an ontology such as RDF (or an ontology such as OWL) even if these resources may not be retrieved on the WWW.

In today's information age, a user often organize resources on their desktop by carefully selecting a folder organization scheme which best suits the user. Typically, when a user creates a folder, he has in mind a set of attributes and/or properties that are satisfied by all objects which would belong to the created folder. It is commonplace for a user to employ a meaningful folder name and organization hierarchy to capture the attributes and properties of objects. As the data on a user's desktop grows, the user often encounters a situation in which his original organizational scheme seems insufficient. The result is that the user may be unable to locate files stored in folders or may expend a large amount of time in locating files.

In order to provide flexibility in facilitating a user's organization of resources stored on his terminal, semantic file systems have been proposed which provide a way for a user to perform attribute-based searches on files. That is to say, techniques have been proposed for using a semantic file system which specifies attribute-value pairs to annotate a folder's content. However, these techniques are generally deemed deficient given the lack of tools to create and query the annotations easily. For example, these techniques may require the user to learn a particular formal language or formalism in which the annotations and/or queries have to be described. Additionally, in some semantic file systems, the attributes of resources or objects associated with a particular folder are assigned based on user inputs which may be deficient from an organizational standpoint and require enormous amounts of repetition and time. Consider a semantic file system such as Google's e-mail service GMail which allows users to add multiple categories (i.e., "type" attributes) to a single object (e.g., e-mail). It should be understood that merely stating the type of an object is not sufficient for organizing resources in a folder because it is not expressive enough. For example, the topic of an e-mail could be a person which serves as one attribute, and the sender (serving as another attribute) could also be a person. If a person named Tom is both the sender and the topic of an e-mail, it becomes difficult to adequately express both these attributes (i.e., topic and sender) without ambiguity.

Against this backdrop, there may be need to utilize benefits of Semantic Web technology to simplify the process of attribute assignment as well as to generate a semantic file system which creates attribute-value pairs to annotate the content of a folder stored on a user's terminal. In this regard, it may be advantageous to provide a method of creating annotations for resources stored in a folder on a terminal by using attribute-value annotations to browse or locate resources in an easy and convenient manner.

BRIEF SUMMARY OF THE INVENTION

In view of the foregoing background, exemplary embodiments of the present invention therefore provide a semantic file system which facilitates creation of attribute-value pairs to annotate a semantic folder stored on a user's terminal (e.g. a desktop of a user's terminal) in order to ease the organization of objects located on the user's terminal. The attribute-value pairs used to annotate the semantic folder may also be used to perform searches for objects stored in the semantic folder(s).

In one exemplary embodiment, a method and apparatus (including a processing element) for creating annotations are provided. The method and apparatus generate one or more semantic folders. The method and apparatus then generate one or more attributes and one or more values, the one or more attributes and the one or more values correspond to the one or more semantic folders. The method and apparatus thereafter receives at least one ontology. The method and apparatus subsequently uses the at least one ontology to specify relationships among the one or more attributes and the one or more values to generate a first plurality of attribute-value pairs. The method and apparatus then links each of the plurality of attribute-value pairs to a respective one of a plurality of uniform resource identifiers to generate a second plurality of attribute-value pairs. The method and apparatus subsequently assigns respective ones of the second plurality of attribute-value pairs to respective ones of the one or more semantic folders.

In another exemplary embodiment, a system for creating annotations is provided. The system includes a means for generating one or more semantic folders. The system further includes a means for generating one or more attributes and one or more values, the one or more attributes and the one or more values correspond to the one or more semantic folders. The system further includes a means for receiving at least one ontology. The system further includes a means for using the at least one ontology to specify relationships among the one or more attributes and the one or more values to generate a first plurality of attribute-value pairs. The system further includes a means for linking each of the plurality of attribute-value pairs to a respective one of a plurality of uniform resource identifiers to generate a second plurality of attribute-value pairs. The system further includes a means for assigning respective ones of the second plurality of attribute-value pairs to respective ones of the one or more semantic folders.

In other exemplary embodiments, a computer program product is provided containing at least one computer-readable storage medium having computer-readable program code portions capable of executing methods of the invention.

BRIEF DESCRIPTION OF THE SEVERAL VIEWS OF THE DRAWINGS

Figure 1:
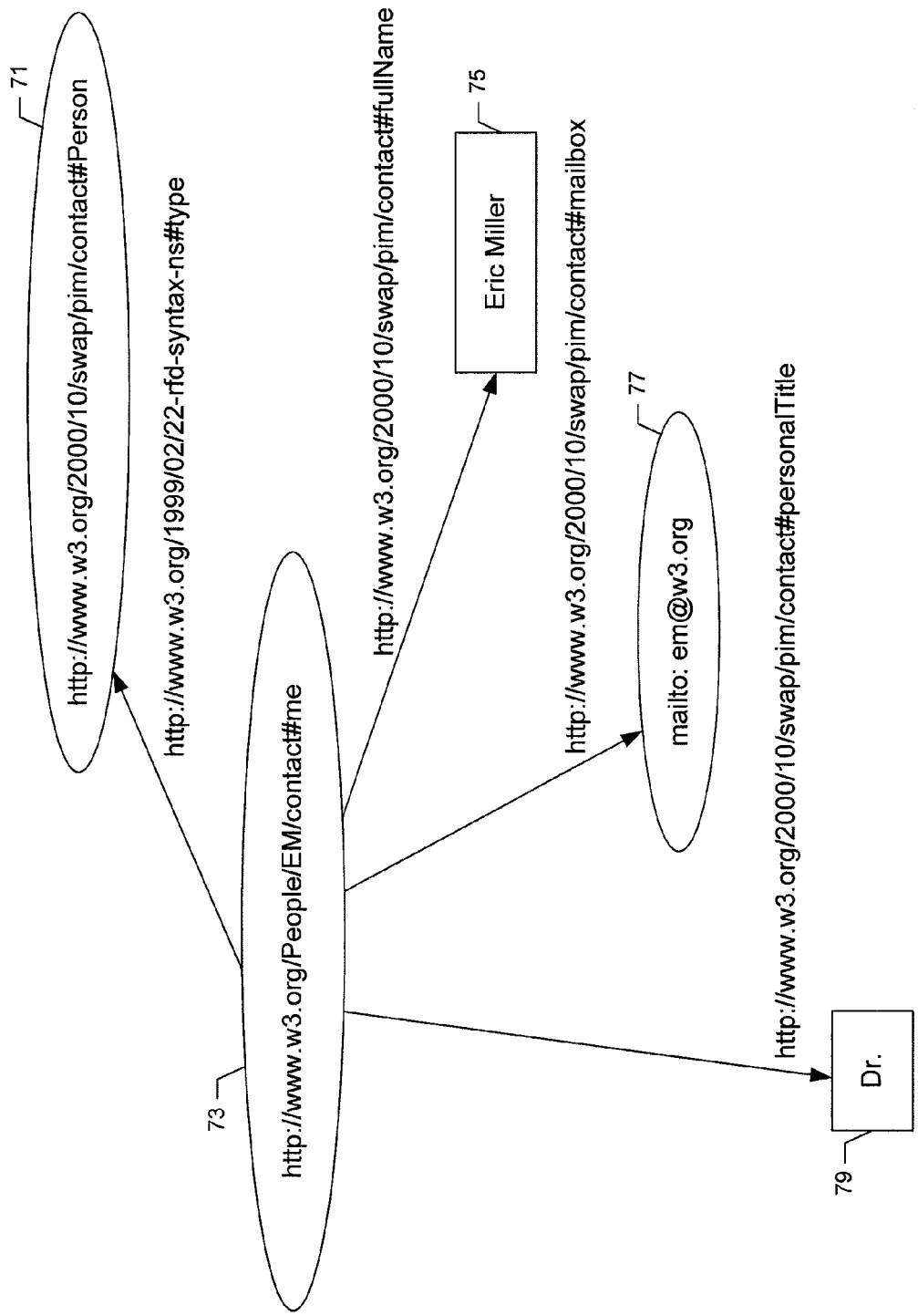
Figure 2:
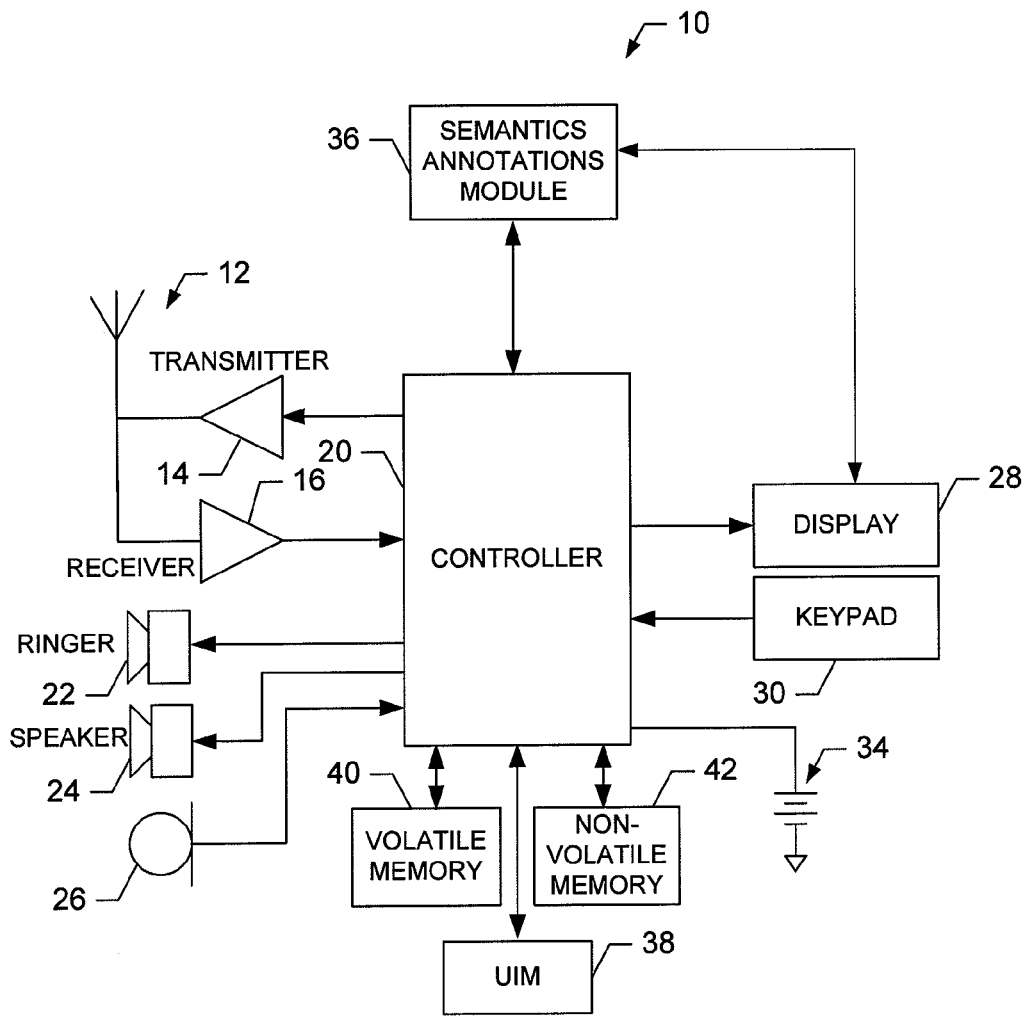
Figure 3:
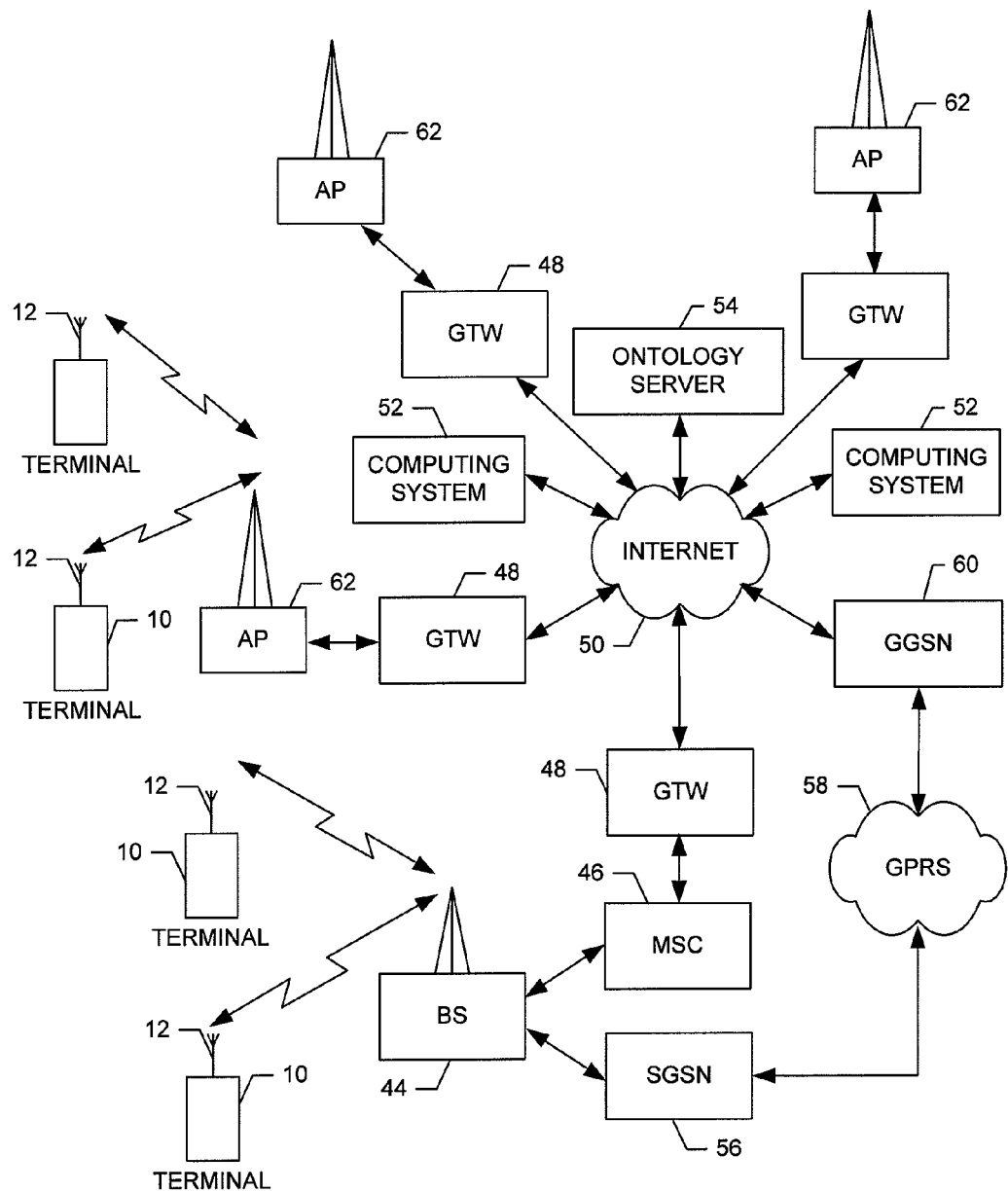
Figure 4:
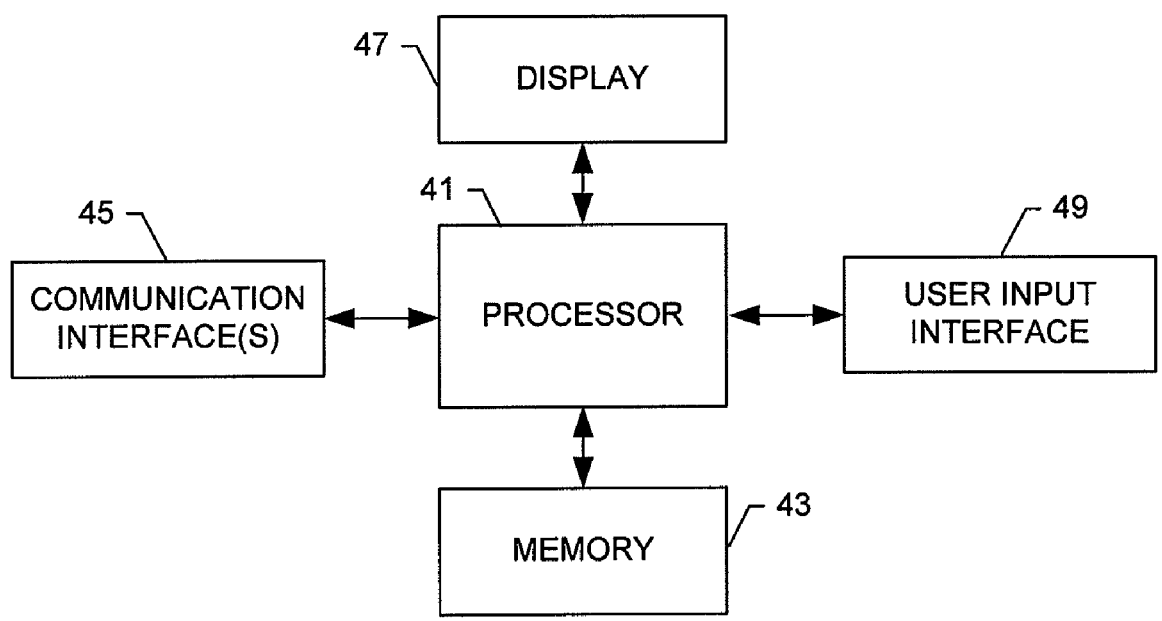
Figure 5:
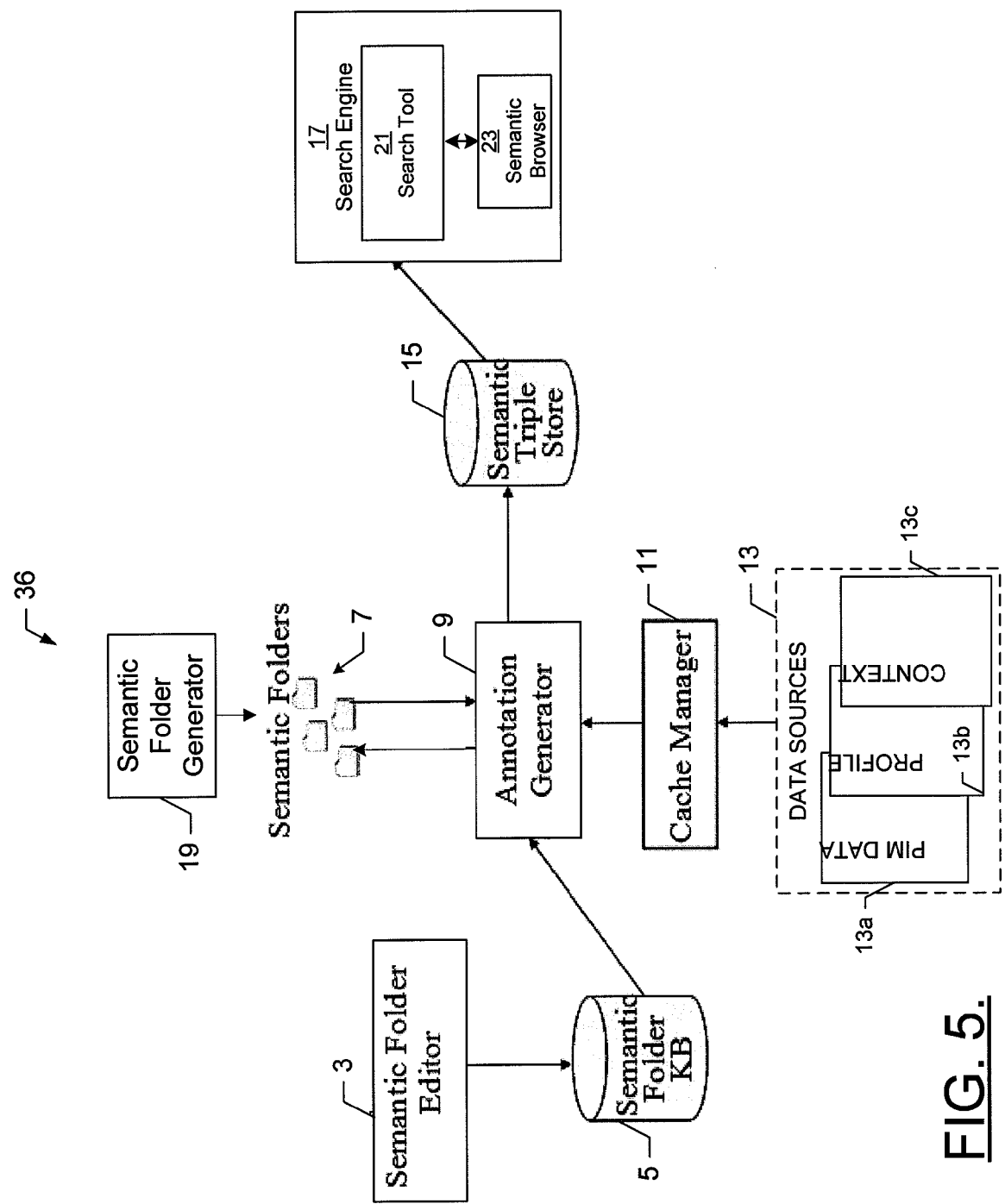
Figure 6:
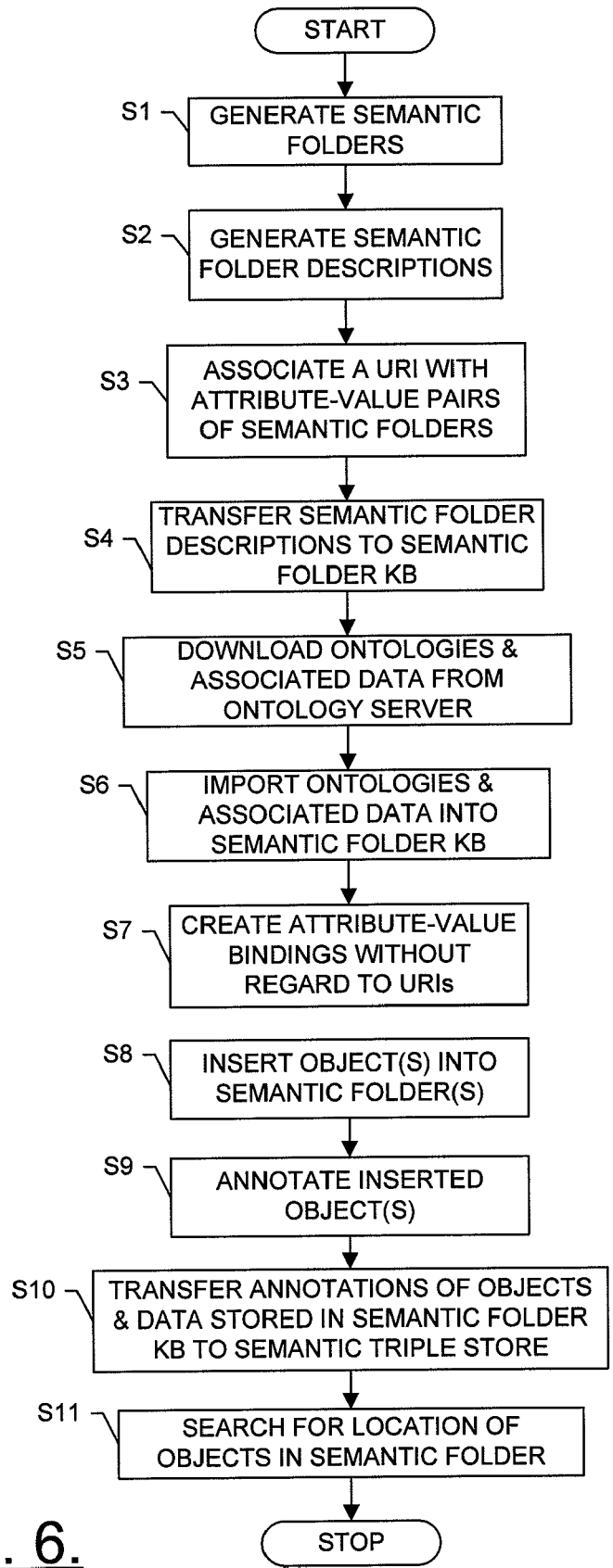
Figure 7:
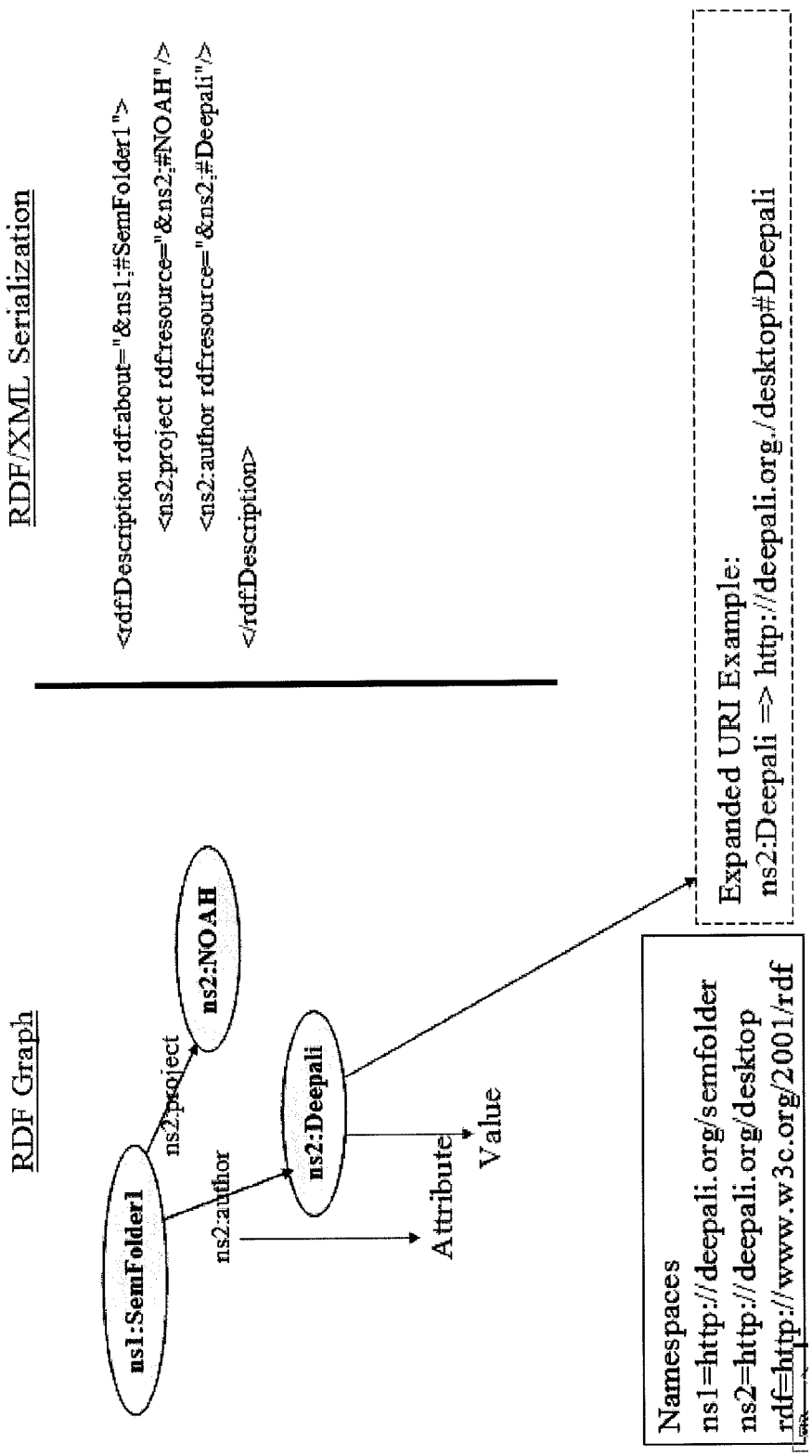
Figure 8:
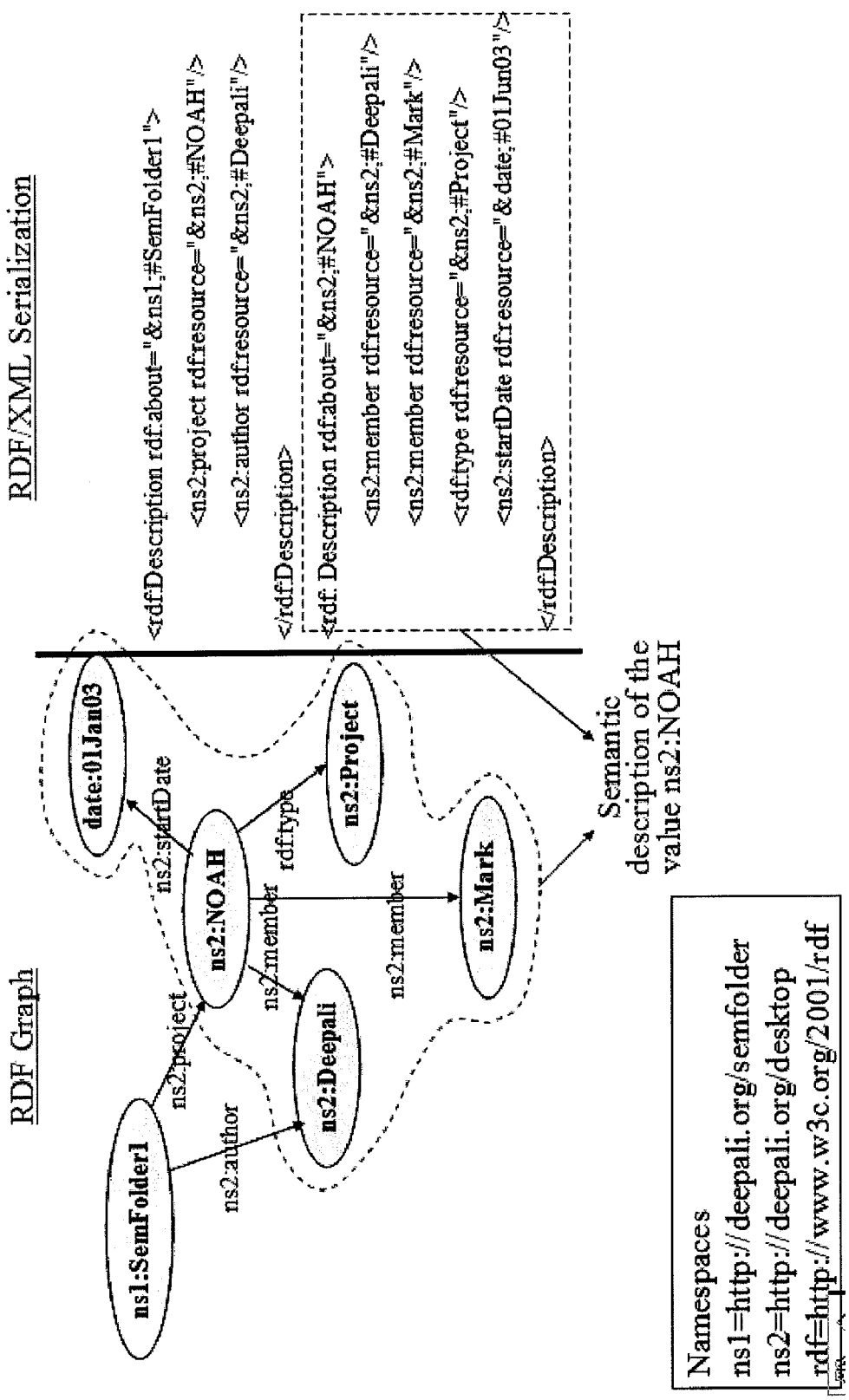
Figure 9:
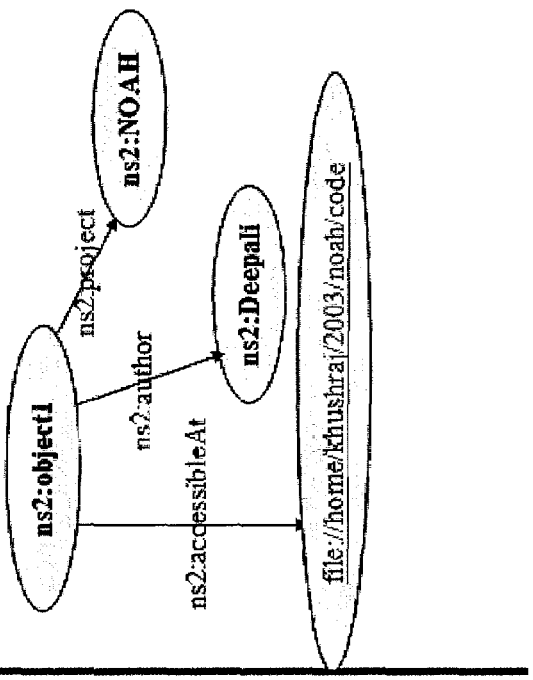
Figure 9:
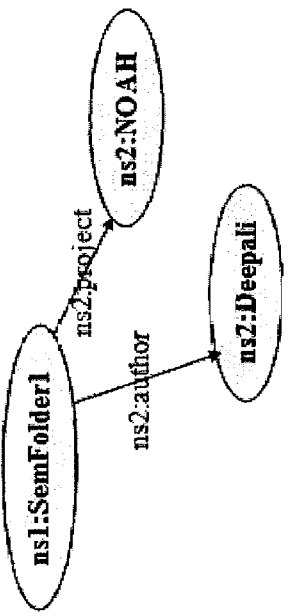
Figure 10:
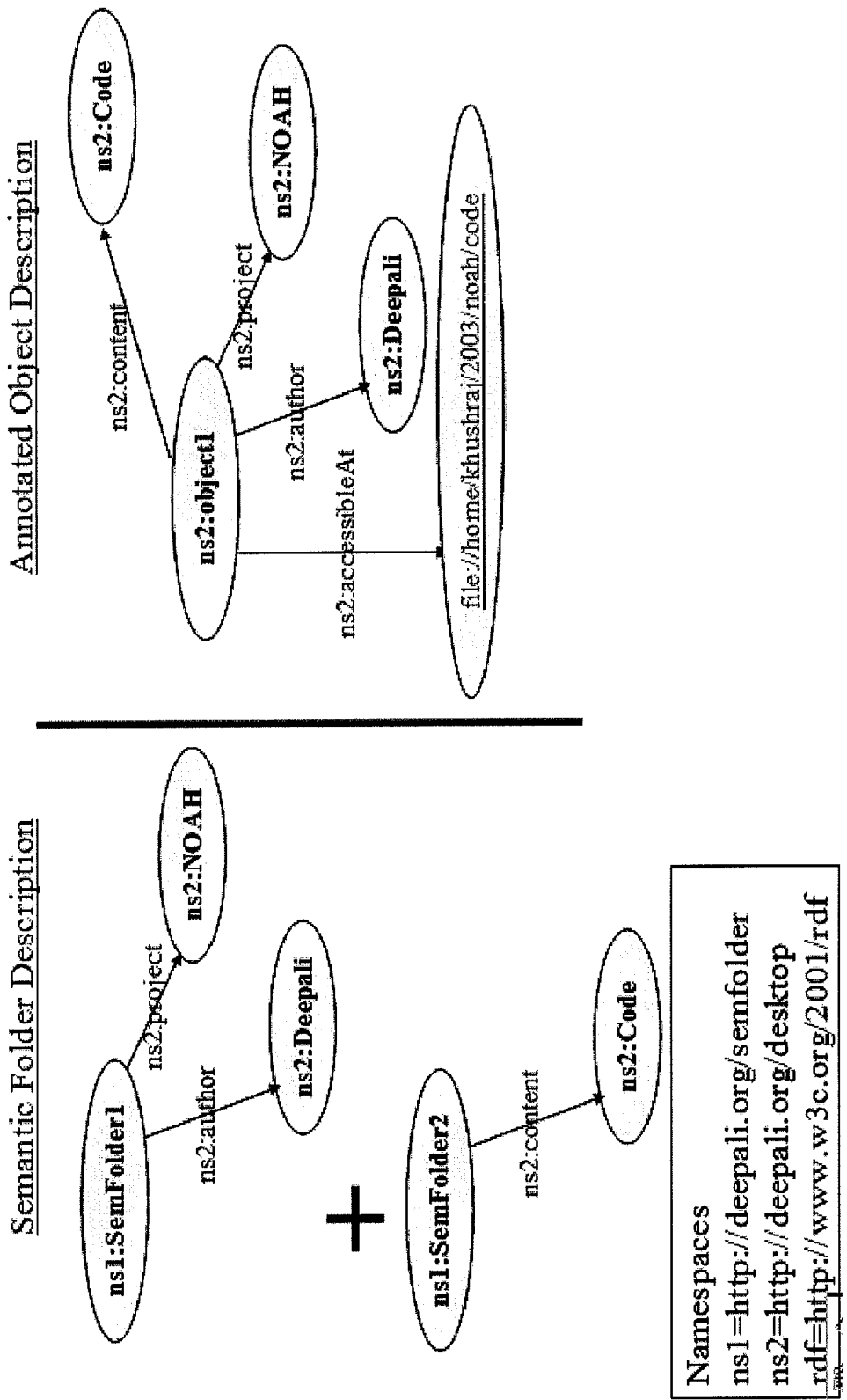

Having thus described the invention in general terms, reference will now be made to the accompanying drawings, which are not necessarily drawn to scale, and wherein:

FIG. 1 is an RDF graph showing a group of statements pertaining to attributes of a person;

FIG. 2 is a block diagram of one type of terminal and system that would benefit from embodiments of the present invention;

FIG. 3 is a schematic block diagram of a wireless communications system according to an exemplary embodiment of the present invention;

FIG. 4 is a schematic block diagram of an entity capable of operating as a computing system and/or an ontology server, in accordance with exemplary embodiments of the present invention;

FIG. 5 is a schematic block diagram of a semantics annotations module according to exemplary embodiments of the present invention;

FIG. 6 is a flowchart including various steps in a method for creating semantic descriptions of semantic folders and for creating annotations associated with resources in a semantics file system;

FIG. 7 illustrates a semantic folder description as a RDF graph and as an RDF/XML serialization according to exemplary embodiments of the present invention;

FIG. 8 illustrates a semantic folder description in RDF along with a semantic description of a value used in the semantic folder description of FIG. 7, according to exemplary embodiments of the present invention;

FIG. 9 illustrates an annotated object after it is inserted into the semantic folder of FIG. 7, according to exemplary embodiments of the present invention; and FIG. 10 illustrates an annotated object that is inserted into two semantic folders, according to exemplary embodiments of the present invention.

DETAILED DESCRIPTION OF THE INVENTION

Embodiments of the present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numerals refer to like elements throughout.

FIG. 2 illustrates a block diagram of a mobile terminal 10 that would benefit from the present invention. It should be understood, however, that a mobile telephone as illustrated and hereinafter described is merely illustrative of one type of mobile terminal that would benefit from the present invention and, therefore, should not be taken to limit the scope of the present invention. While several embodiments of the mobile terminal 10 are illustrated and will be hereinafter described for purposes of example, other types of mobile terminals, such as portable digital assistants (PDAs), pagers, mobile televisions, laptop computers and other types of voice and text communications systems, can readily employ the present invention.

In addition, while several embodiments of the method of the present invention are performed or used by a mobile terminal 10, the method may be employed by other than a mobile terminal. Moreover, the system and method of the present invention will be primarily described in conjunction with mobile communications applications. It should be understood, however, that the system and method of the present invention can be utilized in conjunction with a variety of other applications, both in the mobile communications industries and outside of the mobile communications industries.

The mobile terminal 10 includes an antenna 12 in operable communication with a transmitter 14 and a receiver 16. The mobile terminal 10 further includes a controller 20 or other processing element that provides signals to and receives signals from the transmitter 14 and receiver 16, respectively. The signals include signaling information in accordance with the air interface standard of the applicable cellular system, and also user speech and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second and/or third-generation communication protocols or the like. For example, the mobile terminal 10 may be capable of operating in accordance with second-generation (2G) wireless communication protocols IS-136 (TDMA), GSM, and IS-95 (CDMA) or third-generation wireless communication protocol Wideband Code Division Multiple Access (WCDMA).

It is understood that the controller 20 includes circuitry required for implementing audio and logic functions of the mobile terminal 10. For example, the controller 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The controller 20 thus may also include the functionality to convolutionally encode and interleave message and data prior to modulation and transmission. The controller 20 can additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then allow the mobile terminal 10 to transmit and receive Web content, such as location-based content, according to a Wireless Application Protocol (WAP), for example.

The mobile terminal 10 also comprises a user interface including an output device such as a conventional earphone or speaker 24, a ringer 22, a microphone 26, a display 28, and a user input interface, all of which are coupled to the controller 20. The user input interface, which allows the mobile terminal 10 to receive data, may include any of a number of devices allowing the mobile terminal 10 to receive data, such as a keypad 30, a touch display (not shown) or other input device. In embodiments including the keypad 30, the keypad 30 may include the conventional numeric (0-9) and related keys (#, *), and other keys used for operating the mobile terminal 10. Alternatively, the keypad 30 may include a conventional QWERTY keypad. The mobile terminal 10 further includes a battery 34, such as a vibrating battery pack, for powering various circuits that are required to operate the mobile terminal 10, as well as optionally providing mechanical vibration as a detectable output.

In an exemplary embodiment, the mobile terminal 10 includes a semantic annotations module 36 in communication with the controller 20. The semantic annotations module 36 may be any means or device for generating a semantic file system which specifies attribute-value pairs used to annotate content of a folder containing one or more resources. For example, the semantic annotations module 36 may include all hardware, and software necessary for creating annotations for resources on the mobile terminal 10 so that the created annotations can be used to browse and locate resources on the mobile terminal efficiently and with ease. Alternately, the semantic annotations module may include only the hardware needed to create attribute-value pairs and a memory device of the mobile terminal 10 may store instructions for execution by the controller 20 in the form of software necessary to generate annotations for resources based on the created attribute-value pairs. In an exemplary embodiment, the semantics annotations module 36 may further include a processing element such as a co-processor which assists the controller in generating attribute-value pairs to annotate resources of a folder stored on the mobile terminal 10.

The mobile terminal 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which can be embedded and/or may be removable. The non-volatile memory 42 can additionally or alternatively comprise an EEPROM, flash memory or the like, such as that available from the SanDisk Corporation of Sunnyvale, Calif., or Lexar Media Inc. of Fremont, Calif. The memories can store any of a number of pieces of information, and data, used by the mobile terminal 10 to implement the functions of the mobile terminal 10. For example, the memories can include an identifier, such as an international mobile equipment identification (IMEI) code, capable of uniquely identifying the mobile terminal 10.

Referring now to FIG. 3, an illustration of one type of system that would benefit from the present invention is provided. The system includes a plurality of network devices. As shown, one or more mobile terminals 10 may each include an antenna 12 for transmitting signals to and for receiving signals from a base site or base station (BS) 44. The base station 44 may be a part of one or more cellular or mobile networks each of which includes elements required to operate the network, such as a mobile switching center (MSC) 46. As well known to those skilled in the art, the mobile network may also be referred to as a Base Station/MSC/Interworking function (BMI). In operation, the MSC 46 is capable of routing calls to and from the mobile terminal 10 when the mobile terminal 10 is making and receiving calls. The MSC 46 can also provide a connection to landline trunks when the mobile terminal 10 is involved in a call. In addition, the MSC 46 can be capable of controlling the forwarding of messages to and from the mobile terminal 10, and can also control the forwarding of messages for the mobile terminal 10 to and from a messaging center. It should be noted that although the MSC 46 is shown in the system of FIG. 2, the MSC 46 is merely an exemplary network device and the present invention is not limited to use in a network employing an MSC.

The MSC 46 can be coupled to a data network, such as a local area network (LAN), a metropolitan area network (MAN), and/or a wide area network (WAN). The MSC 46 can be directly coupled to the data network. In one typical embodiment, however, the MSC 46 is coupled to a GTW 48, and the GTW 48 is coupled to a WAN, such as the Internet 50. In turn, devices such as processing elements (e.g., personal computers, server computers or the like) can be coupled to the mobile terminal 10 via the Internet 50. For example, as explained below, the processing elements can include one or more processing elements associated with a computing system 52 (two shown in FIG. 3), ontology server 54 (one shown in FIG. 3) or the like, as described below.

The BS 44 can also be coupled to a signaling GPRS (General Packet Radio Service) support node (SGSN) 56. As known to those skilled in the art, the SGSN 56 is typically capable of performing functions similar to the MSC 46 for packet switched services. The SGSN 56, like the MSC 46, can be coupled to a data network, such as the Internet 50. The SGSN 56 can be directly coupled to the data network. In a more typical embodiment, however, the SGSN 56 is coupled to a packet-switched core network, such as a GPRS core network 58. The packet-switched core network is then coupled to another GTW 48, such as a GTW GPRS support node (GGSN) 60, and the GGSN 60 is coupled to the Internet 50. In addition to the GGSN 60, the packet-switched core network can also be coupled to a GTW 48. Also, the GGSN 60 can be coupled to a messaging center. In this regard, the GGSN 60 and the SGSN 56, like the MSC 46, may be capable of controlling the forwarding of messages, such as MMS messages. The GGSN 60 and SGSN 56 may also be capable of controlling the forwarding of messages for the mobile terminal 10 to and from the messaging center.

In addition, by coupling the SGSN 56 to the GPRS core network 58 and the GGSN 60, devices such as a computing system 52 and/or ontology server 54 may be coupled to the mobile terminal 10 via the Internet 50, SGSN 56 and GGSN 60. In this regard, devices such as the computing system 52 and/or ontology server 54 may communicate with the mobile terminal 10 across the SGSN 56, GPRS core network 58 and the GGSN 60. By directly or indirectly connecting mobile terminals 10 and the other devices (e.g., computing system 52, ontology server 54, etc.) to the Internet 50, the mobile terminals 10 may communicate with the other devices and with one another, such as according to the Hypertext Transfer Protocol (HTTP), to thereby carry out various functions of the mobile terminals 10.

Although not every element of every possible mobile network is shown and described herein, it should be appreciated that the mobile terminal 10 may be coupled to one or more of any of a number of different networks through the BS 44. In this regard, the network(s) can be capable of supporting communication in accordance with any one or more of a number of first-generation (1G), second-generation (2G), 2.5G, third-generation (3G) and/or future mobile communication protocols or the like. For example, one or more of the network(s) can be capable of supporting communication in accordance with 2G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), or the like. Further, for example, one or more of the network(s) can be capable of supporting communication in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile stations (e.g., digital/analog or TDMA/CDMA/analog phones).

The mobile terminal 10 can further be coupled to one or more wireless access points (APs) 62. The APs 62 may comprise access points configured to communicate with the mobile terminal 10 in accordance with techniques such as, for example, radio frequency (RF), Bluetooth (BT), infrared (IrDA) or any of a number of different wireless networking techniques, including wireless LAN (WLAN) techniques such as IEEE 802.11 (e.g., 802.11a, 802.11b, 802.11g, 802.11n, etc.), WiMAX techniques such as IEEE 802.16, and/or ultra wideband (UWB) techniques such as IEEE 802.15 or the like. The APs 62 may be coupled to the Internet 50. Like with the MSC 46, the APs 62 can be directly coupled to the Internet 50. In one embodiment, however, the APs 62 are indirectly coupled to the Internet 50 via a GTW 48. Furthermore, in one embodiment, the BS 44 may be considered as another AP 62. As will be appreciated, by directly or indirectly connecting the mobile terminals 10 and the computing system 52, the ontology server 54, and/or any of a number of other devices, to the Internet 50, the mobile terminals 10 can communicate with one another, the computing system, etc., to thereby carry out various functions of the mobile terminals 10, such as to transmit data, content or the like to, and/or receive content, data or the like from, the computing system 52 and/or the ontology server 54. For instance, ontology server 54 is capable of transmitting one or more ontologies, (such as are known to those skilled in the art) to the mobile terminals 10. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of the present invention.

Although not shown in FIG. 3, in addition to or in lieu of coupling the mobile terminal 10 to computing systems 52 across the Internet 50, the mobile terminal 10 and computing system 52 may be coupled to one another and communicate in accordance with, for example, RF, BT, IrDA or any of a number of different wireline or wireless communication techniques, including LAN, WLAN, WiMAX and/or UWB techniques. One or more of the computing systems 52 can additionally, or alternatively, include a removable memory capable of storing content, which can thereafter be transferred to the mobile terminal 10. Further, the mobile terminal 10 can be coupled to one or more electronic devices, such as printers, digital projectors and/or other multimedia capturing, producing and/or storing devices (e.g., other terminals). Like with the computing systems 52, the mobile terminal 10 may be configured to communicate with the portable electronic devices in accordance with techniques such as, for example, RF, BT, IrDA or any of a number of different wireline or wireless communication techniques, including USB, LAN, WLAN, WiMAX and/or UWB techniques.

Referring to FIG. 4, a block diagram of an entity capable of operating as a computing system 52, or ontology server 54 is shown in accordance with one embodiment of the present invention. Although shown as separate entities, in some embodiments, one or more entities may support one or more of a computing system, or an ontology server logically separated but co-located within the entit(ies). For example, a single entity may support a logically separate, but co-located, computing system 52 and ontology server 54.

The entity capable of operating as a computing system 52 or ontology server 54 includes various means for performing one or more functions in accordance with exemplary embodiments of the present invention, including those more particularly shown and described herein. It should be understood, however, that one or more of the entities may include alternative means for performing one or more like functions, without departing from the spirit and scope of the present invention. More particularly, for example, as shown in FIG. 4, the entity can include a processor 41 connected to a memory 43. The memory can comprise volatile and/or non-volatile memory, and typically stores content, data or the like. For example, the memory typically stores content transmitted from, and/or received by, the entity. Also for example, the memory typically stores software applications, instructions or the like for the processor to perform steps associated with operation of the entity in accordance with embodiments of the present invention. As an ontology server 54, the memory 43 may store, one, or more typically a plurality of ontologies, as known to those skilled in the art, which may be transferred to mobile terminal 10. For instance, the ontology server 54 may, for example, store ontologies represented using RDFS and OWL as well as associated data which may be represented using RDF and/or OWL.

As described herein, the client application(s) may each comprise software operated by the respective entities. It should be understood, however, that any one or more of the client applications described herein can alternatively comprise firmware or hardware, without departing from the spirit and scope of the present invention. Generally, then, the computing system 52 and the ontology server 54 can include one or more logic elements for performing various functions of one or more client application(s). As will be appreciated, the logic elements can be embodied in any of a number of different manners. In this regard, the logic elements performing the functions of one or more client applications can be embodied in an integrated circuit assembly including one or more integrated circuits integral or otherwise in communication with a respective network entity (e.g., the other computing system 52 of FIG. 3) or more particularly, for example, a processor 41 of the respective network entity. The design of integrated circuits is by and large a highly automated process. In this regard, complex and powerful software tools are available for converting a logic level design into a semiconductor circuit design ready to be etched and formed on a semiconductor substrate. These software tools automatically route conductors and locate components on a semiconductor chip using well established rules of design as well as huge libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

In addition to the memory 43, the processor 41 can also be connected to at least one interface or other means for displaying, transmitting and/or receiving data, content or the like. In this regard, the interface(s) can include at least one communication interface 45 or other means for transmitting and/or receiving data, content or the like. For example, the communication interface(s) can include a first communication interface for connecting to a first network, and a second communication interface for connecting to a second network. In addition to the communication interface(s), the interface(s) can also include at least one user interface that can include one or more earphones and/or speakers, a display 47, and/or a user input interface 49. The user input interface, in turn, can comprise any of a number of devices allowing the entity to receive data from a user, such as a microphone, a keypad, a touch display, a joystick, image capture device (e.g., digital camera) or other input device.

Exemplary embodiments of the present invention will be described herein with reference to the RDF ontology discussed above in the background section. It should be understood, however, that exemplary embodiments of the present invention may be equally applicable with reference to a number of other ontologies (e.g., OWL ontology), without departing from the spirit and scope of the present invention.

An exemplary embodiment of the invention will now be described with reference to FIG. 5, in which certain elements of a semantics annotations module 36 for annotating resources are displayed. The system of FIG. 5 may be employed, for example, on the mobile terminal 10 of FIG. 2. However, it should be noted that the system of FIG. 5, may also be employed on a variety of other devices, both mobile and fixed, and therefore, the present invention should not be limited to application on devices such as the mobile terminal of FIG. 2. It should also be noted, however, that while FIG. 5 illustrates one example of a configuration of a system for creating annotations for resources, numerous other configurations may also be used to implement the present invention.

Referring now to FIGS. 5 and 6, a system and method for creating semantic descriptions of semantic folders and creating annotations associated with resources (or objects) in a semantics file system is provided. A user of a terminal (e.g., mobile terminal 10) may generate one or more semantic folders by selecting a semantic folder generator 19. (See block S1 of FIG. 6) Selection of the semantic folder generator 19 in order to generate one or more semantic folder(s) 7 include, but are not limited to, double clicking the semantic folder generator by using keys of keypad 30, or by using a pointer such as a cursor for example or right clicking the semantic folder generator 19 with a pointer (or cursor) and selecting a new folder button of a context menu. (As defined herein, a context menu refers to one or more menus which may pop-up on a display (or a desktop) when clicking an item in a graphical user interface. The context menu offers a list of options (i.e., menus, buttons or fields) which vary depending on the context of an action, and the menu, button or field that is selected by a user.) It should be pointed out that a semantic folder as referred to herein is a virtual folder used to annotate and query objects on a user's terminal or system (e.g., a virtual folder used to annotate and query objects stored on a desktop of a user's terminal). In an exemplary embodiment, semantic folders 7 may used to annotate and query objects shown on display 28 of mobile terminal 10.

Semantic folder editor 3 is a visual editor tool in the form of any device or means which allows a user to create and modify semantic folder descriptions (i.e., naming the semantic folder(s) 7). For instance, a user may use keypad 30 to type in semantic folder descriptions into semantic folder editor 3 which may be shown on a display such as, for example, display 28. The semantic folder editor 3 may be employed by a user to generate a semantic folder description by linking or binding desired attribute-value pairs. (See block S2 of FIG. 6) The attribute-value pairs may relate to underlying resources that may subsequently be stored in a semantic folder(s) 7. Consider, for example, a scenario in which a user desires that a respective semantic folder has a description corresponding to papers or documents authored by Deepali Khushraj. In this regard, the user may describe an attribute of the semantic folder as "author" and may describe a "value" of the semantic folder as Deepali (i.e., the name of the author). As such, the semantic folder would be described by the attribute-value pair author-deepali. In like manner, if the user desired that the same semantic folder have a description corresponding to a project, the user may describe an attribute as project and may describe a value as NOAH, i.e., the name of the project. In this regard, the semantic folder 7 would be described by attribute-value pairs author-deepali and project-NOAH. As referred attributes, include but are not limited to the names (identifications) of properties that objects may have. As referred to herein, values, include but are not limited to the particular instantiations of these properties. For example, if an object which is described as having "red" as its "color", then "color" is the attribute and "red" is the value. In exemplary embodiments of the present invention, the user may employ an easy-to-use interface in introducing and/or editing attributes and their values by using semantic folder editor 3 or for example, a form that may be completed as provided by the semantic folder editor.)

In addition to a semantic folder 7 being described by attribute-value pairs, semantic folder editor 3 may be utilized to uniquely identify a URI with corresponding attribute-value pairs. That is to say, each attribute-value pair generated by a user may be uniquely defined using a URI, and the URI's value could be a string, as known to those skilled in the art. URIs possess the property that different persons or organizations can independently create them, and use them to identify things, objects or resources even if the things, objects or resources do not have network locations and are not retrievable via the WWW, as known to those skilled in the art. (As referred to herein, an object includes, but is not limited to files, images, folders, bookmarks, e-mails, Web pages, documents, spreadsheets, presentations, etc.) For instance, a URI could be generated for a human being. In this regard, a user may type in a URI into the semantic folder editor 3 (via keypad 30) and associate the URI with a corresponding attribute-value pair associated with the description of the semantic folder 7.

The semantic folder editor 3 may associate the URI with the corresponding attribute-value pair using a link menu button of the semantic folder editor 3, for example. (See block S3 of FIG. 6) The same URI that is generated for a corresponding attribute-value pair relative to a description of a given semantic folder 7 may also be used to describe attributes or values of a different semantic folder 7. This is because the user may desire that resources or objects which relate to each other be stored in multiple semantic folders. As such, the URIs are useful in connecting related objects (i.e., resources such as, for example, e-mail and Web pages, etc. that are related to each other). The semantic folder descriptions (i.e., attribute-value pairs and corresponding URIs) created using semantic folder editor 3 may be transferred to and stored in semantic folder knowledge base (KB) 5. (See block S4 of FIG. 6) In an exemplary embodiment, the semantic folder KB 5 may be a database or memory device capable of storing information or data in a computer-readable (or machine-readable) form. It should be pointed out that a unique identifier can be used in place of a URI to define an attribute-value pair. (For example, a URL could be used, or any other scheme of identifying attributes, which does not have to be a standardized scheme, but which may be devised for the purpose of defining the attribute-value pair. However, as known to those skilled in the art, using URIs enable greater control over data such as attribute-value pairs by linking the attribute-value pairs to URIs on the WWW, thereby allowing the attribute-value pairs to be assessable or linked (via the WWW) to a terminal of another user.

Since attributes and values specified by a user, via the semantic folder editor 3, can be associated with URIs which may be reused for multiple semantic folder descriptions, there should typically be an easy mechanism in which the user may specify the attribute-value pairs and the corresponding URIs. That is to say, without requiring the user to manually type URIs of the attribute and value fields into keypad 30 so that the semantic folder editor 3 can generate the semantic description. Moreover, it would be advantageous if a user was unaware of the existence of an underlying URI corresponding to the specified attribute-value pair. Instead, of being presented with a URI such as, for example, "http://deepali.org/desktop/author," as the description of a semantic folder, it would be beneficial for the user to be presented with a human-readable name corresponding to the semantic folder description, such as, for example "author."

Depending on a user's domain of interest, he could download one or more ontologies (e.g., ontologies represented using RDFS (as a vocabulary language for describing vocabularies in RDF) and OWL) and associated data corresponding to different sources (e.g., data represented using RDF or OWL) from various servers (e.g., ontology server 54) and organizations. (See block S5 of FIG. 6) (As referred to herein, "domain of interest" may relate to the particular interests of a user. For example, if a user annotates photographs, the user might want to use an ontology specifically designed and defined for that purpose. As referred to herein "associated data," includes but is not limited to, possible (e.g., permissible) values for a particular attribute. For example, if the user's annotations relate to geography, then associated data might include the names of all the countries in the world. The downloaded ontolog(ies) and associated data may be imported to semantic folder editor 3 and subsequently transferred to semantic folder KB 5. As such, the imported ontolog(ies) and associated data along with existing folder descriptions of the generated semantic folders 7 comprises data that is stored in the semantic folder KB 5. (See block S6 of FIG. 6) The downloaded ontolog(ies) and associated data may alleviate the need for a user to manually type URIs of attribute and value fields in the semantic folder editor by using keypad 30. For instance, the downloaded ontolog(ies) may specify classes of objects and relationships among the attribute-value pairs stored in the semantic folder KB 5 to thereby generate corresponding URIs.

More particularly, if the RDF ontology, for example, is used to model the data corresponding to the attribute-value pairs, stored in the semantic folder KB 5, the RDFS vocabulary may be used to generate unique URIs for each attribute-value pair. This is because RDF is premised on the notion that things or objects being described have properties which have values and that resources can be described by making statements that specify those properties and values. Similarly, the downloaded ontolog(ies) such as, for example, RDF and associated data stored in semantic folder KB 3 enables a user to be presented with a human-readable name (e.g., author) corresponding to a semantic folder description as opposed to a machine-readable name such as, for example, "http://deepali.org/desktop/author." This is because RDF also describes things in terms of simple (i.e., human readable) properties and values. For instance, RDF allows for the possibility that a human-readable "label" may be associated with any concept or data value, allowing that label to be presented to the user via a user interface rather than presenting the URI identifying the said object, as known to those skilled in the art.

As such, the semantic folder KB 5 may utilize the stored ontolog(ies) and associated data to determine the manner in which the semantic descriptions (i.e., annotations) should be provided (or assigned) to the semantic folders 7. The user will thus be able to link attribute-value pairs, without obtaining any information concerning the underlying URIs and their semantic descriptions in the semantic folder KB 5. (See block S7 of FIG. 6)

For instance, consider FIG. 7 which illustrates a semantic folder description using RDF as a data model. As shown in the RDF graph of FIG. 7, the RDF ontology examines the relationships between the attribute-value pairs stored on semantic folder KB 5 and classifies (or assigns) attribute-value pairs that relate to each other to a semantic folder i.e., ns1:SemFolder1, having a namespace ns1. As can be seen in FIG. 7, the RDF ontology may determine that the attribute "author" and the value "Deepali" relate to one another and link the attribute-value pair ns2:author-ns2:Deepali (where ns2 is a namespace) to the description of ns1:SemFolder1. Similarly, the RDF ontology may determine that the attribute "project" and the value "NOAH" relate to one another and link the attribute-value pair ns2:project-ns2:NOAH to the description of ns1:SemFolder1. Each of the namespaces, namely, ns1 and ns2 represent a URI corresponding to the semantic folder SemFolder1 and the attribute-value pairs. By using a namespace representative of a URI instead of the actual URI in the description of the semantic folder (i.e., ns1:SemFolder1) and for the attribute-value pairs, a user is presented with a semantic folder description in a human-readable form. The RDF graph of FIG. 7 may be represented by a namespace rdf having a URI http://www.w3.org/1999/02/22-rdf-syntax-ns#. As shown in FIG. 7, a value may also be identified by a URI. For instance, value ns2:Deepali may be identified by a URI http://deepali.org./desktop#Deepali. As described above in the background section, RDF also provides an XML-based syntax (RDF/XML) serialization which corresponds to the RDF graph. With regards to the RDF/XML serialization of FIG. 7, the semantic folder description (i.e., SemFolder1) is represented by <rdf:Description rdf:about="?ns1;#SemFolder1"> whereas the attribute value-pairs are represented by <ns2:project rdf:resource="&ns2;#NOAH"/> and <ns2:author rdf:resource="&ns2;#Deepali"/>, respectively. Given that the RDF/XML serialization uses namespaces (i.e., n1, n2, rdf) instead of the actual URI corresponding to the namespace, a user is able to link attribute-value pairs, without having the underlying URIs in the semantic description.

It should be pointed out that the attributes and values of a semantic folder 7 may also have a semantic description (i.e., annotations) associated with them. In this regard, consider FIG. 8, which illustrates a semantics folder description and a semantics description of a value shown in FIG. 1 which uses the RDF data model. More precisely, FIG. 8 illustrates a semantics description of value ns2:NOAH shown in FIG. 7. As shown, in FIG. 8, the value ns2:NOAH may have a semantic description corresponding to several linked attribute-value pairs, namely ns2:startDate-date:01Jan2003, rdf:type-ns2:Project (where rdf:type is an attribute), ns2:member-ns2:Mark and ns2:member-ns2:Deepali. The shaded box around the RDF-XML based syntax (RDF/XML) represents the RDF/XML Serialization version of the semantic description for the value ns2:NOAH. As can be seen in FIG. 8, the RDF/XML serialization represents the attribute-value pairs linked to ns2:NOAH as <ns2:member rdf:resource="&ns2; #Deepali"/>, <ns2:member rdf:resource="&ns2;#Mark"/>, <rdf:type rdf:resource="&ns;Project"/> (where rdf:type is an attribute) and <ns2:startDate rdf:resource="&date; #01Jun03"/>. If a user makes the location of these semantic descriptions (i.e., annotations) available to a corresponding terminal or system, it would allow him to perform advanced searches of resources stored on the terminal or system.

Reference will be made back to FIGS. 5 and 6, now that the manner in which the semantic folder descriptions has been described. After the semantic folder descriptions are generated, objects or resources stored on a memory of a user terminal (e.g., memory 40 or memory 42 of mobile terminal 10) may be dragged and dropped (i.e., inserted or moved, for example, by using elements of keypad 30) into a semantic folder 7. (See block S8 of FIG. 6). Once an object is dropped into a semantic folder 7, the annotation generator 9 examines the semantic folder 7. The annotation generator 9 then processes (via controller 20) the action (e.g., inserting the object in a semantic folder 7) and triggers an event to annotate the dropped object. (See block S9 of FIG. 6) In this regard, the annotation generator 9 annotates the object dropped into the semantic folder by assigning all of the attribute value-pairs, used to describe the semantic folder 7, to the object. As such, all of the attribute-value pairs of the semantic folder 7 become attribute-value pairs of the dropped object. (See e.g., FIG. 9)

It should be pointed out that a user may utilize semantic folder editor 3 to create new attribute-value pairs that may not currently be stored as data in the semantic folder KB 5. In such instances, a value associated with an attribute may only be determined during a run-time (i.e., a time when an object is dropped or inserted into a semantic folder) by linking (or binding) an attribute with a value function. In this regard, the semantic folder KB 5 can support run-time value assertions. Examples of value functions according to exemplary embodiments of the present invention include, but are not limited to, current-time ( ), current-user-city ( ), etc.

The technique in which the user inserts an object into a semantic folder is not pertinent to the manner in which the inserted object is annotated. For instance, in addition to drag and dropping an object into a semantic folder, the user could insert the object into a semantic folder by any number of ways, including but not limited to, right-clicking the object, making a copy of the object, selecting the relevant semantic folder from a context menu field and pasting the copy into the semantic folder. Additionally, a user may employ features of command line tools to insert objects into semantic folders, etc. For example, commands typed into a command line tool such as, for example, a command to "move file 1 into folder 2" may perform the action of inserting (or dropping an object into a semantic folder 7. It should be pointed out that a user may insert one or objects into more than one semantic folder 7. When a user inserts an object into more than one semantic folder, the annotations generator 9 assigns all of the attribute-value pairs associated with each of the corresponding semantic folders to the object. (See e.g., FIG. 10)

According to exemplary embodiments of the present invention, a user may also remove an object from a semantic folder by either deleting the object or dragging the object out (i.e., removing the object) of a semantic folder. When an object is removed from a semantic folder all attribute-value pairs (i.e., annotations) acquired from the corresponding semantic folder are deleted from the object.

In order to select the semantic folders 7 which may be visible on a display of a terminal (e.g., display 28), or visible in a context menu located on the display (so that objects may be inserted into the semantics folders) the user may select the semantic folders manually using keys of keypad 30 for example. Alternately, the semantic folders could be selected automatically using specialized algorithms. For example, the algorithms could use a LRU (Least Recently Used) based caching scheme, a semantic caching scheme, a scheme that relies on the user's context (e.g., location, social surroundings, active applications, etc.) or a combination of these schemes to select the semantic folders automatically. Particularly, each of these algorithms may be utilized to reduce the number of folders that an object may be inserted in. In other words, the algorithms allow the prioritization or ordering of a reduced set of folders in which a user may insert an object(s). If only one semantic folder is located on a display (e.g., display 28), each of the algorithms above may automatically select that semantic folder as the folder in which the object is inserted. Each of the above-mentioned algorithms may include software instructions which may be executed by a processing element or by controller 20.

The cache manager 11 of the semantics annotations module 36 may optionally facilitate the selection of semantic folders even in instances where there are many semantic folders created by the user. In this regard, the cache manager 11 may prioritize semantic folders by using context information available corresponding to the user. The priorities established by the cache manager 11 can be invoked by the annotations generator 9 to select semantic folders that should be visible on the user's display (e.g., display 28). Additionally, the priorities established by the cache manager 11 can be used by the annotations generator 9 to order or prioritize semantic folders listed in a context menu, when the user right-clicks on an object that needs to be annotated. The semantic folder with the highest order or priority demonstrates to the user that the object should be inserted into the respective folder. The cache manager 11 may contain an algorithm formed of software instructions for prioritizing or ordering the semantic folders. The algorithm may be executed by a processing element or controller 20 for example. The software instructions of the algorithm may prioritize or order semantic folders based on factors such as, recency of use, frequency of use, the user's current tasks, the user's current location, the time of day, etc. These factors may be evaluated based on a personal profile 13*b* of data source 13 corresponding to user attributes which may be retrieved by the cache manager 11. The cache manager 11 may also receive additional information from PIM information (PIM) (PIM data 13*a*), such as address book entries, calendar entries, or the like, associated with the user. Additionally or alternately, for example, the cache manager may receive additional information from the user's current context and/or context history (context 13*c*).

The annotations generator 9 may transfer the annotations attached to the objects that are inserted into semantic folder(s) 7 to the semantic triple store 15. In this regard, the semantic triple store 15 may be a database which stores the annotations. It should be pointed out that in some situations, the value functions will need to be invoked to annotate an object inserted into a semantic folder before it is transferred to the triple store. The annotations generator 9 may also receive and transfer the data stored in semantic folder KB 5 (namely the semantics folder descriptions of all the generated semantic folders 7 and the ontolog(ies) and the associated data downloaded from ontology server 54) to the semantics triple store 15. (See block S10 of FIG. 6) This data may be retrieved by the search engine 17 when the user seeks to perform searches for an object. According to the exemplary embodiments of the present invention, when an object gets annotated by the annotation generator 9, the annotation includes the description that was attached to the semantic folder along with the physical location of the object which may be stored in a memory of the user's terminal (e.g., memory 40 or memory 42 of mobile terminal 10), file system or any other place, specified by a URL.

The search tool 21 of search engine 17 may be employed by the user to locate relevant objects on his terminal (e.g., mobile terminal 10) or a corresponding file system (or links to remote objects). (See block S11 of FIG. 6) In this regard, the user may type in the name of the object in the search tool 21 and execute a find command to locate the object in one or more semantic folders 7. The search engine 17 analyzes the semantic folder descriptions and annotations attached to each object that are stored in semantic triple store 15 to determine the location of one or more objects in corresponding semantic folders. Moreover, a semantic browser 23 of the search engine 17 may be employed by a user to browse data stored in the semantic triple store 15 in order to locate relevant objects in semantic folders 7. In an exemplary embodiment, the semantic browser 23 could be an OINK semantic browser, from Nokia Research, or a BrownSauce RDF semantic browser, manufactured by BrownSauce.

Given that the annotation generator 9 annotates an object by assigning all attribute-value pairs corresponding to the semantic folder that the object is inserted into, a user may use the search tool 21 of search engine 17 to perform searches by specifying the attributes of the objects that he is trying to locate. Moreover, the search tool 21 may be employed by the user to perform keyword based searches. In this regard, the user may specify keywords corresponding to attribute-value pairs. For instance, the user may type "author deepali" and/or "project NOAH" into keypad 30 which may be entered into the search tool 21. Upon enabling a find or locate command, the search tool 21 may search the semantic triple 15 store for objects having the attribute-value pair "author-deepali" as well as the attribute-value pair "project-NOAH", for example. Alternately, a user may search for objects by pointing a pointer or cursor at a semantic folder on a display such as display 28 (or a desktop or an alternate location) and selecting the semantic folder to thereby invoke a find query field of a context menu. By invoking the find query field, all objects associated with the description attached to the selected folder will be retrieved and may be displayed on display 28 (or a desktop). The retrieved objects may be evaluated by the user to locate the object(s) that he is seeking. The user may invoke a find query field for all objects that satisfy the description attached to the selected semantic folder. The find query field could also be utilized to locate objects in the semantic folder by specifying additions/deletions/or updates to one or more of the attribute-value pairs of the selected semantic folder.

Referring to FIG. 9, an annotated object that is dropped (or inserted) into the semantic folder of FIG. 7 is provided. In FIG. 9, as previously noted, the respective semantic folder has a semantic description of ns1:SemFolder1 and it has an attribute-value pair of ns2:author-ns2:Deepali. Additionally, the semantic folder of FIG. 9 has an attribute-value pair of ns2:project-ns2:NOAH. As shown in FIG. 9, when an object such as ns2:object1 is dropped in the semantic folder described by ns1:SemFolder1, object1 is assigned all of the attribute-value pairs of ns1:SemFolder1, namely, ns2:author-ns2:Deepali and ns2:project-ns2:NOAH. Also, as shown in FIG. 9, the object ns2:object1 is accessible at the URI "file://home/khushraj/2003/noah/code".

Referring now to FIG. 10, an example of an annotated object that is inserted into two semantic folders is provided. As shown in FIG. 10, a user inserted an object, namely ns2:object1 into semantic folder 1 having a description ns1:SemFolder1 with an attribute-value pair such as ns2:author-ns2:Deepali and an attribute-value pair ns2:project-ns2:NOAH. Similarly, the user inserted the object ns2:object1 into semantic folder 2 having a description ns1:SemFolder2 with an attribute-value pair ns2:content-ns2Code. As can be seen in FIG. 10, the annotation generator 9 may annotate the object by assigning all of the attribute-value pairs of semantic folder 1 (i.e., ns1:SemFolder1) and semantic folder 2 (i.e., ns2:SemFolder2) to the object ns2:object1 (i.e., attribute-value pairs ns2:author-ns2:Deepali, ns2:project-ns2:NOAH of ns1:SemFolder1 was assigned to ns2:object1 and attribute-value pair ns2:content-ns2Code of ns1:SemFolder2 was assigned to ns2:object1). It should also be pointed out that object ns2:object1 is accessible at the URI "file://home/khushraj/2003/noah/code". In this regard, ns2:object1 may be assessable, via the WWW, by terminals belonging to other users.

The method for creating semantic descriptions of semantic folders and creating annotations associated with resources in a semantic file system as set forth in FIG. 6 may be embodied by a computer program product. The computer program product includes a computer-readable storage medium, such as the non-volatile storage medium, and computer-readable program code portions, such as a series of computer instructions, embodied in the computer-readable storage medium. Typically, the computer program is stored by a memory device, such as memory 40 or memory 42, and executed by an associated processing element, such as controller 20.

In this regard, FIG. 6 is a flowchart of a method and program product according to exemplary embodiments of the invention. It will be understood that each step of the flowchart, and combinations of the steps in the flowchart, can be implemented by computer program instructions. These computer program instructions may be loaded onto a computer or other programmable apparatus to produce a machine, such that the instructions which execute on the computer or other programmable apparatus create means for implementing the functions specified in the flowchart step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart step(s).

Accordingly, steps of the flowchart support combinations of means for performing the specified functions, combinations of steps for performing the specified functions and program instruction means for performing the specified functions. It will also be understood that each step of the flowchart, and combinations of steps in the flowchart, can be implemented by special purpose hardware-based computer systems which perform the specified functions or steps, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method comprising:
   generating one or more semantic folders;
   generating, via a processor, one or more attributes and one or more values, the one or more attributes and the one or more values correspond to the one or more semantic folders;
   facilitating receipt of at least one ontology;
   facilitating usage of the at least one ontology to specify relationships among the one or more attributes and the one or more values to generate a first plurality of attribute-value pairs;
   linking each of the plurality of attribute-value pairs to a respective one of a plurality of uniform resource identifiers to generate a second plurality of attribute-value pairs; and
   assigning respective ones of the second plurality of attribute-value pairs to respective ones of the one or more semantic folders.

2. The method according to claim 1, further comprising:
   inserting at least one object into at least one of the one or more semantic folders; and
   assigning the second plurality of attribute-value pairs assigned to the at least one of the one or more semantic folders to the at least one object to obtain a first plurality of annotations.

3. The method according to claim 2, further comprising:
   inserting the at least one object into at least two of the one or more semantic folders; and
   assigning the second plurality of attribute-value pairs assigned to the at least two of the one or more semantic folders to the at least one object to obtain a second plurality of annotations.

4. The method according to claim 3, further comprising:
   linking the at least one object to a uniform resource identifier;
   facilitating storage of the first plurality of annotations and the second plurality of annotations; and
   analyzing the first plurality of annotations, the second plurality of annotations, and the second plurality of attribute-value pairs to locate the at least one object.

5. The method according to claim 4, further comprising:
   prioritizing the one or more semantic folders based on information corresponding to a user;
   facilitating selection of one of the one or more semantic folders having a highest priority; and
   inserting the at least one object into the selected one or more semantic folders.

6. The method according to claim 4, further comprising, using the uniform resource identifier corresponding to the at least one object to retrieve the at least one object via the world wide web.

7. The method according to claim 5, wherein the information comprises data pertaining to at least one of frequency of use relative to resources, tasks, location and time of day.

8. The method according to claim 2, wherein the at least one object comprises one of a file, document, image, e-mail, Web page, bookmark, spreadsheet and presentation.

9. The method according to claim 1, wherein at least one of an attribute or a value of the second plurality of attribute-value pairs is linked to a third plurality of attribute-value pairs.

10. The method according to claim 1, wherein the at least one ontology corresponds to either one of a resources description framework ontology or an ontology web language ontology.

11. The method according to claim 4, wherein the first plurality of annotations and the second plurality of annotations specify the physical location of the at least one object.

12. An apparatus comprising:
    at least one processor; and
    at least one memory including computer program code, the at least one memory and the computer program code configured to, with the at least one processor, cause the apparatus to at least perform the following:
    generate one or more semantic folders;
    generate one or more attributes and one or more values, the one or more attributes and the one or more values correspond to the one or more semantic folders;
    facilitate receipt of at least one ontology;
    facilitate usage of the at least one ontology to specify relationships among the one or more attributes and the one or more values to generate a first plurality of attribute-value pairs;
    link each of the plurality of attribute-value pairs to a respective one of a plurality of uniform resource identifiers to generate a second plurality of attribute-value pairs; and
    assign respective ones of the second plurality of attribute-value pairs to
    respective ones of the one or more semantic folders.

13. The apparatus according to claim 12, wherein the at least one memory and the computer program code are configured to, with the at least one processor, cause the apparatus to:
    insert at least one object into at least one of the one or more semantic folders; and
    assign the second plurality of attribute-value pairs assigned to the at least one of the one or more semantic folders to the at least one object to obtain a first plurality of annotations.

14. The apparatus according to claim 13, wherein the at least one memory and the computer program code are configured to, with the at least one processor, cause the apparatus to:
    insert the at least one object into at least two of the one or more semantic folders; and
    assign the second plurality of attribute-value pairs assigned to the at least two of the one or more semantic folders to the at least one object to obtain a second plurality of annotations.

15. The apparatus according to claim 14, wherein the at least one memory and the computer program code are configured to, with the at least one processor, cause the apparatus to:
    link the at least one object to a uniform resource identifier;
    facilitate storage of the first plurality of annotations and the second plurality of annotations; and
    analyze the first plurality of annotations, the second plurality of annotations, and the second plurality of attribute-value pairs to locate the at least one object.

16. The apparatus according to claim 15, wherein the at least one memory and the computer program code are configured to, with the at least one processor, cause the apparatus to:
    prioritize the one or more semantic folders based on information corresponding to a user;

facilitate selection of one of the one or more semantic folders having a highest priority; and insert the at least one object into the selected one or more semantic folders.

17. The apparatus according to claim 15, wherein the at least one memory and the computer program code are configured to, with the at least one processor cause the apparatus to, use the uniform resource identifier corresponding to the at least one object to retrieve the at least one object via the world wide web.

18. The apparatus according to claim 12, wherein at least one of an attribute or a value of the second plurality of attribute-value pairs is linked to a third plurality of attribute-value pairs.

19. The apparatus according to claim 12, wherein the at least one ontology corresponds to either one of a resource description framework ontology or an ontology web language ontology.

20. The apparatus according to claim 15, wherein the first plurality of annotations and the second plurality of annotations specify the physical location of the at least one object.

21. A computer program product comprising at least one computer-readable storage medium having computer-readable program code portions stored therein, the computer-readable program code portions are executed by a computer processor, the computer-readable program code portions comprising:

a first executable portion configured to generate one or more semantic folders;

a second executable portion configured to generate one or more attributes and one or more values, the one or more attributes and the one or more values correspond to the one or more semantic folders;

a third executable portion configured to facilitate receipt of at least one ontology;

a fourth executable portion configured to facilitate usage of the at least one ontology to specify relationships among the one or more attributes and the one or more values to generate a first plurality of attribute-value pairs;

a fifth executable portion configured to link each of the plurality of attribute-value pairs to a respective one of a plurality of uniform resource identifiers to generate a second plurality of attribute-value pairs; and a sixth executable portion configured to assign respective ones of the second plurality of attribute-value pairs to respective ones of the one or more semantic folders.

22. The computer program product according to claim 21, further comprising:

a seventh executable portion configured to insert at least one object into at least one of the one or more semantic folders; and an eighth executable portion configured to assign the second plurality of attribute-value pairs assigned to the at least one of the one or more semantic folders to the at least one object to obtain a first plurality of annotations.

23. The computer program product according to claim 22, further comprising:

a ninth executable portion configured to insert the at least one object into at least two of the one or more semantic folders; and a tenth executable portion configured to assign the second plurality of attribute-value pairs assigned to the at least two of the one or more semantic folders to the at least one object to obtain a second plurality of annotations.

24. The computer program product according to claim 23, further comprising:

an eleventh executable portion configured to link the at least one object to a uniform resource identifier;

a twelfth executable portion configured to facilitate storage of the first plurality of annotations and the second plurality of annotations; and a thirteenth executable portion configured to analyze the first plurality of annotations, the second plurality of annotations, and the second plurality of attribute-value pairs to locate the at least one object.

25. The computer program product according to claim 24, further comprising:

a fourteenth executable portion configured to prioritize the one or more semantic folders based on information corresponding to a user;

a fifteenth executable portion configured to facilitate selection of one of the one or more semantic folders having a highest priority; and a sixteenth executable portion configured to insert the at least one object into the selected one or more semantic folders.

26. The computer program product according to claim 24, further comprising a seventeenth executable portion configured to use the uniform resource identifier corresponding to the at least one object to retrieve the at least one object via the world wide web.

27. The computer program product according to claim 21, wherein at least one of an attribute or a value of the second plurality of attribute-value pairs is linked to a third plurality of attribute-value pairs.

28. The computer program product according to claim 21, wherein the at least one ontology corresponds to either one of a resources description framework ontology or an ontology web language ontology.

29. The computer program product according to claim 23, wherein the first plurality of annotations and the second plurality of annotations specify the physical location of the at least one object.

30. An apparatus comprising:

processor means for generating one or more semantic folders;

means for generating one or more attributes and one or more values, the one or more attributes and the one or more values correspond to the one or more semantic folders;

means for facilitating receipt of at least one ontology;

means for facilitating usage of the at least one ontology to specify relationships among the one or more attributes and the one or more values to generate a first plurality of attribute-value pairs;

means for linking each of the plurality of attribute-value pairs to a respective one of a plurality of uniform resource identifiers to generate a second plurality of attribute-value pairs; and means for assigning respective ones of the second plurality of attribute-value pairs to respective ones of the one or more semantic folders.

31. The apparatus according to claim 30, further comprising:

means for inserting at least one object into at least one of the one or more semantic folders; and means for assigning the second plurality of attribute-value pairs assigned to the at least one of the one or more semantic folders to the at least one object to obtain a first plurality of annotations.

* * * * *